(12) United States Patent
Murano et al.

(10) Patent No.: US 8,398,039 B2
(45) Date of Patent: Mar. 19, 2013

(54) MOUNTING PANEL, SYSTEM AND METHOD FOR HIGH DENSITY FIBER OPTIC APPLICATIONS

(75) Inventors: Adam Murano, Lebanon, CT (US); Chester Rynaski, Franklin, CT (US); David Hubbard, Pleasanton, CA (US)

(73) Assignee: Ortronics, Inc., New London, CT (US)

( * ) Notice: Subject to any disclaimer, the term of this patent is extended or adjusted under 35 U.S.C. 154(b) by 234 days.

(21) Appl. No.: 12/871,129

(22) Filed: Aug. 30, 2010

(65) Prior Publication Data
US 2012/0049017 A1 Mar. 1, 2012

(51) Int. Cl.
*G02B 6/36* (2006.01)
*G02B 6/00* (2006.01)
(52) U.S. Cl. ............. 248/205.1; 248/200; 248/300; 385/134; 385/135
(58) Field of Classification Search ........... 248/205.1, 248/200, 300; 385/134, 135
See application file for complete search history.

(56) References Cited

U.S. PATENT DOCUMENTS

| | | | | |
|---|---|---|---|---|
| 2,634,340 | A * | 4/1953 | Batcheller | 200/5 E |
| 4,834,486 | A * | 5/1989 | Walker | 385/134 |
| 6,250,816 | B1 * | 6/2001 | Johnston et al. | 385/53 |
| 6,526,210 | B1 * | 2/2003 | Harrison et al. | 385/134 |
| 2008/0298762 | A1 * | 12/2008 | Hawley et al. | 385/135 |

OTHER PUBLICATIONS

ICC HiPerlink Fiber "Plug and Play" Solution Product information Sheet, Complex 10G Fiber Cabling, Doc. No. MMILIT0471-0509, La Miranda, CA, p. 1-2, 2009, available at: http://www.icc.com/images/pdf/MPR-0471-final.pdf.
Electro Standards Laboratories High-Density, Pre-Terminated Fiber Optic Cassette, Model 6008, Cranston, RI, p. 1-2, 2009, available at: http://www.photonics.com/Article.aspx?AID=36431.
Panduit Corp., Specification Sheet for QuickNet MTP Fiber Optic Cassettes, Doc. No. WW-FBSP37, p. 1-2, 2010, available at: http://www.panduitcom/groups/MPM-BR/documents/SpecificationSheet/CMSCONT_035207.pdf.
MPO Fiber Optic Cassettes, Shenzhen Conwow Business, p. 1-3, 2010, available at: http://www.alibaba.com/product-gs/278855175/MPO_Fiber_Optic_Cassettes.html.

* cited by examiner

*Primary Examiner* — Anita M King
(74) *Attorney, Agent, or Firm* — McCarter & English, LLP

(57) ABSTRACT

A mounting plate having at least two L-shaped mounting flanges alternatively offset from a centerline defined to bisect the mounting flanges. A mounting system including a plurality of mounting plates with interlocking mounting flanges positioned horizontally on a mounting frame of one standard rack unit (1.75 inches) height. A mounting system including a plurality of mounting footprints with overlapping fastener flanges positioned horizontally on a mounting frame of one standard rack unit width. A method of mounting plates configured and dimensioned to receive a fiber optic coupler or adapter including a mounting a plurality of plates having at least two L-shaped mounting flanges into a mounting frame such that the mounting flanges of adjacent plates are configured to interlock or overlap.

15 Claims, 6 Drawing Sheets

MOUNTING PANEL, SYSTEM AND METHOD FOR HIGH DENSITY FIBER OPTIC APPLICATIONS

BACKGROUND

1. Technical Field

This disclosure relates generally to panels, systems and methods for mounting fiber optic connective devices within a rack or cabinet and, more particularly, to mounting panels/systems/methods that allow increased density without sacrificing performance. The disclosed mounting panels/systems/methods advantageously accommodate conventional fiber optic adapters.

2. Background Art

Wired and connected hardware are an integral part of a typical building telecommunications wiring system. In central offices, data centers and other wired buildings, fiber optic patch panels have become a necessary media to route connections between switches, servers, storage devices and the general office area. By "patching," or temporarily creating a connection between physically mated connectors, it is possible to reconfigure network connections from a central location. As the telecommunication needs of users have increased, the number of devices and the density with which they are stored in Local Area Networks (LANs) have increased. Adding connective devices, such as cassettes or adapter panel assemblies, to a LAN may place additional strain on the capacity of fiber optic network cabling. In particular, the channel capacity of fiber optic network cabling may be disadvantageously limited by the physical size of the installed connective devices.

Fiber optic cassettes allow for patching of optical data link(s) from a backbone cable to other devices. Fiber optic cassettes are generally adapted to support a plurality of fiber optic adapters for convenient interconnection with fiber optic cables. As is known in the art, the term "adapter" is interchangeable with the term "coupler" and generally refers to a device that facilitates and/or creates a connection between two fiber optic connectors/ferrules, each containing and/or supporting a light carrying fiber medium.

In fiber optic structured cabling systems, fiber optic patching frequently occurs within a component called a sub-rack enclosure. Conventional sub-rack enclosures are box-like structures that include mounting brackets to allow and/or facilitate installation into a rack or cabinet. The sub-rack enclosure typically has a mounting surface that can support a plurality of adapters/couplers. The number of adapters/couplers that may be mounted in a sub-rack enclosure is generally limited by the physical size of the connective devices to be installed, thereby limiting adapter/coupler density.

Accordingly, a need exists for effective mounting panels, systems and methods capable of allowing increased network density. These and other needs are met, and the disadvantages and/or limitations of prior art panels, systems and methods are addressed and/or overcome, by the panels, systems and methods of the present disclosure.

SUMMARY

The present disclosure describes effective mounting panels, systems and methods for mounting fiber optic adapters/couplers into a rack or cabinet at higher density. In an exemplary embodiment, the mounting configuration of high density fiber optic mounting panels include offset flanges configured to allow for interlocking positioning with respect to a mounting rack. In another exemplary embodiment, the mounting panels are configured to allow adjacent flanges to overlap—when viewed in a horizontal plane—such that a plurality of adapters/couplers and/or blank cover panels can be positioned in closer proximity.

Thus, in exemplary implementations of the present disclosure, a mounting plate is provided that includes (i) a mounting body having opposite ends; and (ii) at least two L-shaped mounting flanges located at the opposite ends. The disclosed mounting body generally defines a centerline bisecting the opposite ends, and the mounting flanges are alternatively offset from the centerline of the mounting body. The mounting plate may be fabricated from various materials, e.g., metal, plastic or a combination thereof. The disclosed mounting plate may be advantageously configured as the front plate of a connective device in a LAN. The disclosed mounting plates of the present disclosure may advantageously include L-shaped mounting flanges that are partially defined by a substantially curved extension portion or a substantially triangular extension portion.

The present disclosure further provides advantageous mounting systems for connective devices that include, inter aria, (i) a first plate having a mounting body including at least two L-shaped mounting flanges at opposite ends thereof; (ii) a second plate having a mounting body including at least two L-shaped mounting flanges at opposite ends thereof; and (iii) a mounting frame. The first plate and the second plate of the disclosed mounting system are generally adapted for side-by-side mounting relative to the mounting rack, with the L-shaped flanges in an interlocking or overlapping orientation. In addition, the mounting body generally defines a centerline that bisects the opposite ends. The mounting flanges may be alternatively offset from the centerline of the mounting body. The mounting body also generally defines a centerline bisecting the opposite ends, and the mounting flanges may be alternatively offset from the centerline of the mounting body.

As with the mounting plates identified above, the disclosed mounting systems may be fabricated from various materials, e.g., metal, plastic or a combination thereof. The L-shaped mounting flanges associated with the disclosed mounting system may be at least partially defined by a substantially curved extension portion or a substantially triangular extension portion. Of note, exemplary implementations of the disclosed mounting system employ mounting frames that are one standard rack unit in height, although multiple rack unit implementations thereof may be employed.

The present disclosure also advantageously provides a method of mounting connective devices that includes, inter alia, (i) providing a first plate having a mounting body including at least two L-shaped mounting flanges at opposite ends thereof; wherein the mounting body defines a centerline bisecting the opposite ends and the mounting flanges are alternatively offset from the centerline of the mounting body; wherein the mounting body is configured and dimensioned to support at least one coupler or adapter; (ii) providing a mounting frame configured and dimensioned to receive a plurality of plates; (iii) fastening the first plate to the mounting frame; (iv) providing a second plate having a mounting body including at least two L-shaped mounting flanges at opposite ends thereof; wherein the mounting body defines a centerline bisecting the opposite ends and the mounting flanges are alternatively offset from the centerline of the mounting body; wherein the mounting body is configured and dimensioned to support at least one coupler or adapter; and (v) fastening the second plate adjacent to the first plate within the mounting frame such that the mounting flanges of one side of the first plate interlock or overlap with the mounting flange of the adjacent side of the second plate.

Additional advantageous features, functions and structural aspects of the disclosed systems and methods will be apparent from the detailed description which follows, particularly when read in conjunction with the appended figures.

BRIEF DESCRIPTION OF THE DRAWINGS

To assist those of ordinary skill in the art in making and using the disclosed panels, systems and methods, reference is made to the appended figures, wherein:

FIG. 4 is a partial view of another exemplary mounting plate of the present disclosure depicting another alternate configuration for the mounting flanges;

DESCRIPTION OF EXEMPLARY EMBODIMENT(S)

The present disclosure provides for panels, systems and methods for mounting connective devices for telecommunication equipment effectively within racks or cabinets. An exemplary mounting plate includes a mounting body with at least two L-shaped mounting flanges at opposite ends thereon. The L-shaped mounting flanges are alternatively offset from a centerline. The centerline is defined perpendicular to the portion of the mounting flanges that extends from the mounting plate. An exemplary mounting system includes a plurality of mounting plates with interlocking mounting flanges positioned horizontally on a mounting frame of one standard rack unit (1.75 inches) height. Another exemplary mounting system includes a plurality of mounting plates with overlapping mounting flanges positioned horizontally on a mounting frame, e.g., a mounting frame of one standard rack unit height. Such mounting plates and configurations advantageously facilitate mounting of adapters/couplers and/or blank cover plates in closer proximity.

Figure 1:
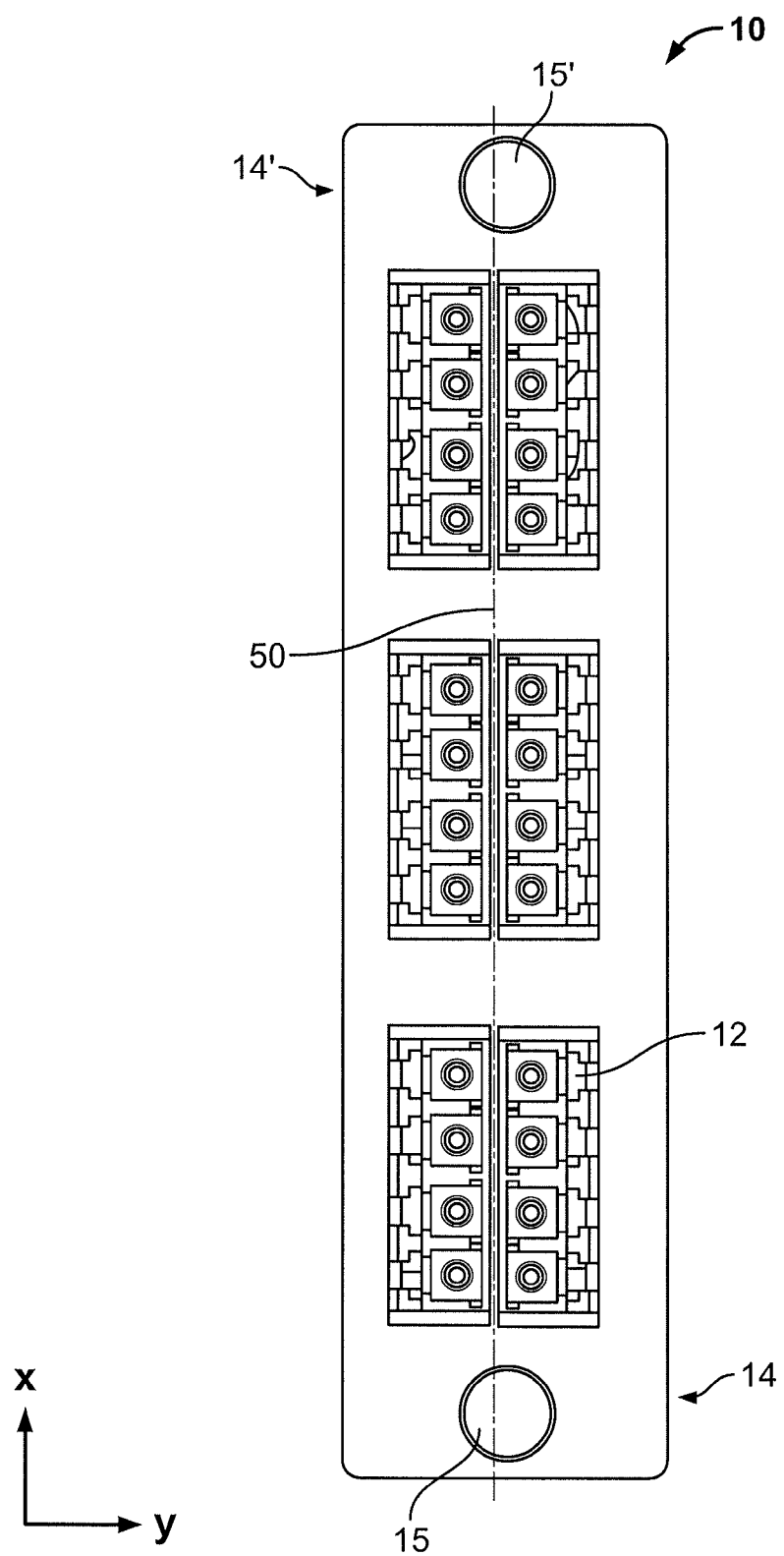
FIG. 1 is a schematic illustrating a prior art mounting plate for fiber optic adapters/couplers.

With reference to FIG. 1, a prior art mounting plate 10 for a connective installed device is illustrated. The prior art mounting plate 10 is substantially rectangular and is depicted as the front plate of a device having an LC Quad-style adapter 12. The mounting plate 10 includes fastening portions 14 and 14'. Fastening portions 14 and 14' include circular holes 15 and 15' configured to receive screws for fastening to a sub-rack enclosure. Circular holes 15 and 15' are generally located on a center line 50, parallel and equidistant from the longer legs of the rectangular mounting plate 10. Fastening portions 14 and 14' are located adjacent to the shorter legs of the rectangular mounting plate 10. Mounting plate 10 is generally installed into a sub-rack enclosure by fastening screws through holes 15 and 15' into screw-receiving apertures formed in the sub-rack enclosure. Mounting plate 10 is installed into a sub-rack enclosure such that the longest legs of the plate lies along the y-axis, i.e., the mounting plate 10 is positioned vertically.

Figure 2:
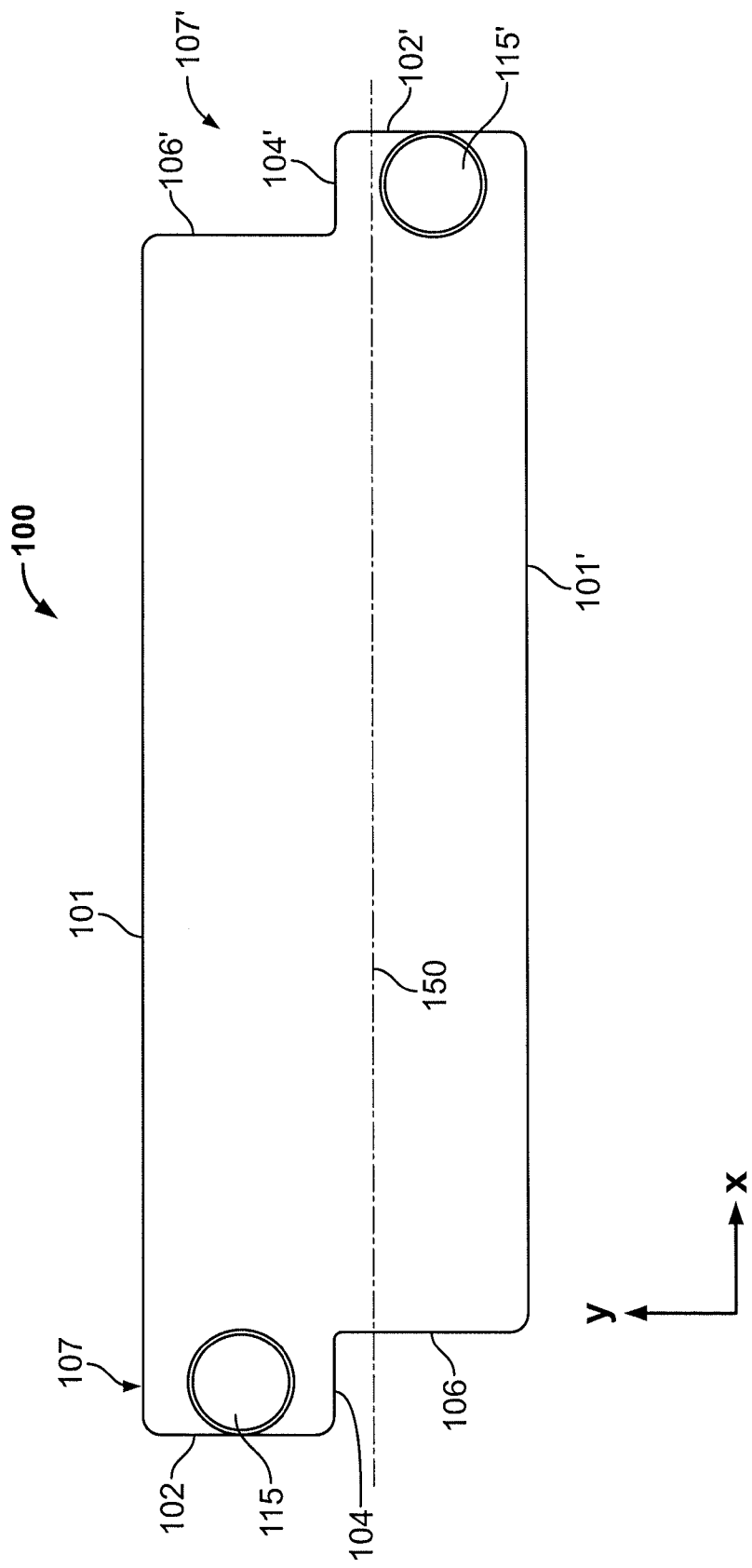
FIG. 2 is a schematic illustrating an exemplary mounting plate of the present disclosure.

With reference now to FIG. 2, an exemplary mounting plate 100 of the present disclosure is illustrated. Mounting plate 100 may be fabricated of metal, molded plastic or a combination thereof, and may be formed by conventional technologies, e.g., extrusion, stamping, molding, etc. Mounting plate 100 may be configured to act as or receive the front plate of a connective device, e.g., a coupler or adapter, by removing one or more portions of plate 100 to allow for mounting of the connective device relative thereto. Plate 100 may be configured to receive a connective device, e.g., a coupler or adapter, by any mounting method.

In all exemplary embodiment, mounting plate 100 defines L-shaped mounting flanges at opposite ends thereof. A first L-shaped mounting flange 107 is defined by edges 102, 104 and 106. A second L-shaped mounting flange 107' is defined by edges 102', 104' and 106'. A centerline 150 is defined equidistant from and parallel to edges 101 and 101' and bisecting L-shaped mounting flanges 107 and 107'. Mounting flanges 107 and 107' include substantially circular holes 115 and 115', respectively. Mounting flange 107 lies above centerline 150 in the y-direction. Mounting flange 107' lies below center line 150 in the y-direction. Plate 100 may be installed into a mounting frame by fastening screws through holes 115 and 115' into a screw receiving aperture formed in the mounting frame.

Figure 3:
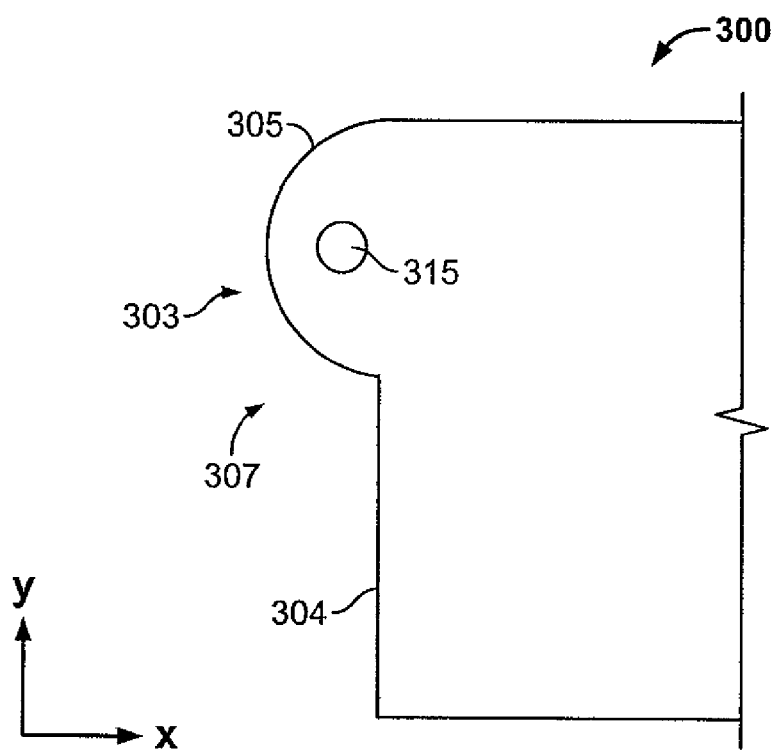
FIG. 3 and FIG. 4 are partial front views of exemplary alternate configurations for the mounting plate of FIG. 2.
Figure 4:
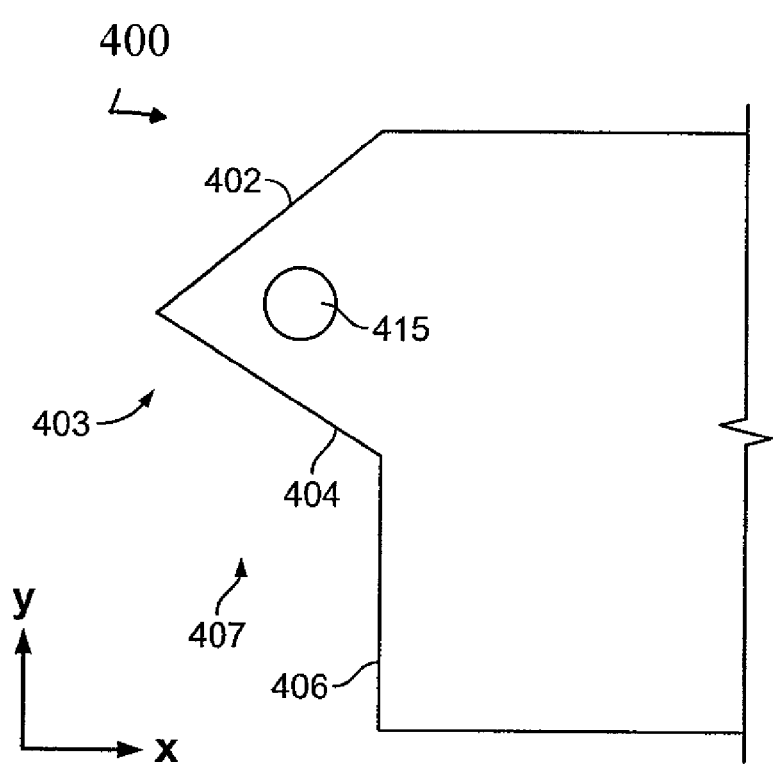

With reference now to FIG. 3 and FIG. 4, a partial view of exemplary alternate configurations of the L-shaped mounting flanges are illustrated. In FIG. 3, mounting plate 300 includes mounting flange 307 which is defined by curved edge 305 and edge 304. Edge 305 forms a substantially curved portion 303 that accommodates hole 315. In an alternative embodiment depicted in FIG. 4, mounting plate 400 includes mounting flange 407 which is defined by edges 402, 404 and 406. Edges 402 and 404 form a substantially triangular portion 403 that accommodates hole 415. It will be further understood that mounting flanges may be of any shape that accommodates holes for receiving fasteners.

Figure 5:
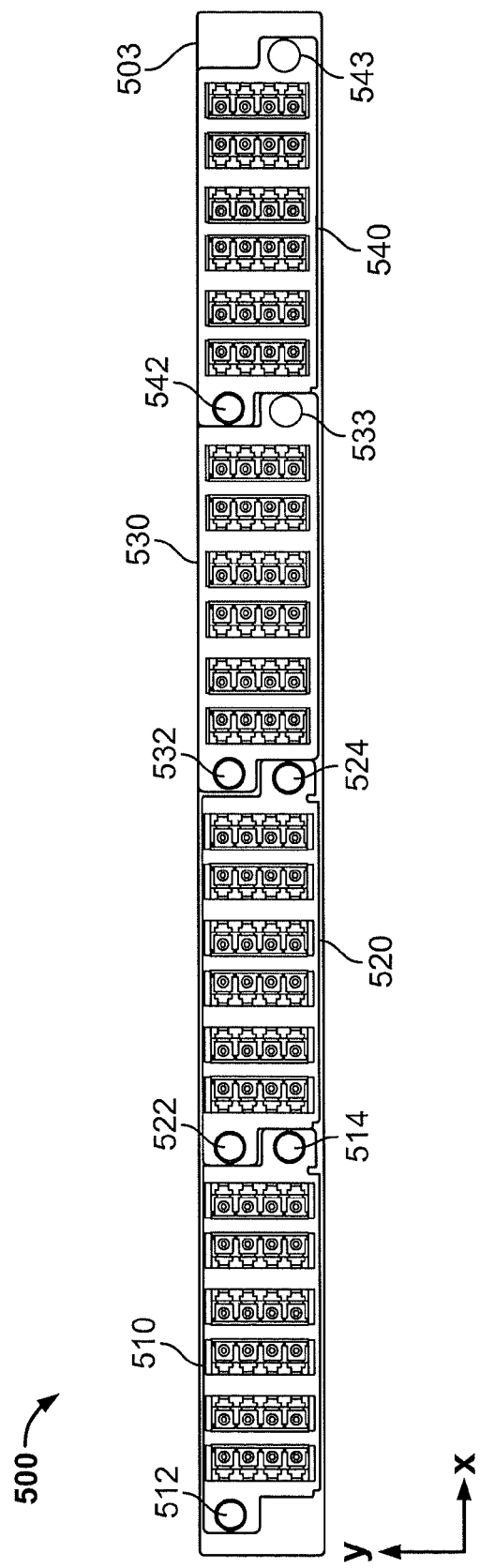
FIG. 5 is a front view of a plurality of interlocked mounting plates, namely four (4) interlocking mounting plates, positioned in side-by-side orientation according to the present disclosure.

Turning now to FIG. 5, a front view of an exemplary mounting arrangement 500 onto a mounting frame 503 is illustrated. The mounting arrangement 500 includes connective devices 510 and 520 and plates 530 and 540, each having the exemplary mounting plate of FIG. 2. Mounting frame 503 is one standard rack unit in height in the y-direction. Mounting frame 503 is configured to receive connective devices 510 and 520 and plates 530 and 540 through fastener receiving apertures defined therein. As is known in the art, mounting frame 503 may be constructed of any material capable of receiving a plurality of connective devices therein mounted. Each device, 510 and 520, and plate, 530 and 540, is configured and arranged such that adjacent mounting flanges interlock with each other. Connective devices 510 and 520 are fastened to mounting frame 503 by fasteners 512, 514, 522 and 524. Plates 530 and 540 are attached to mounting frame 503 with fasteners 532 and 542, respectively. Fasteners 512, 514, 522, 524, 532 and 542 may be any hardware suitable to ensure stable retention of the devices and plates within mounting rack 503. In particular, the fasteners 512, 514, 522, 524, 532 and 542 may be screws with retaining nuts, captive hardware, tamper resistant hardware or hook-loop fastenings. In alternative embodiments, plates 530 and 540 may be attached to mounting frame 503 at holes 533 and 543 in lieu of or in conjunction with fasteners 532 and 542, respectively.

Figure 6:
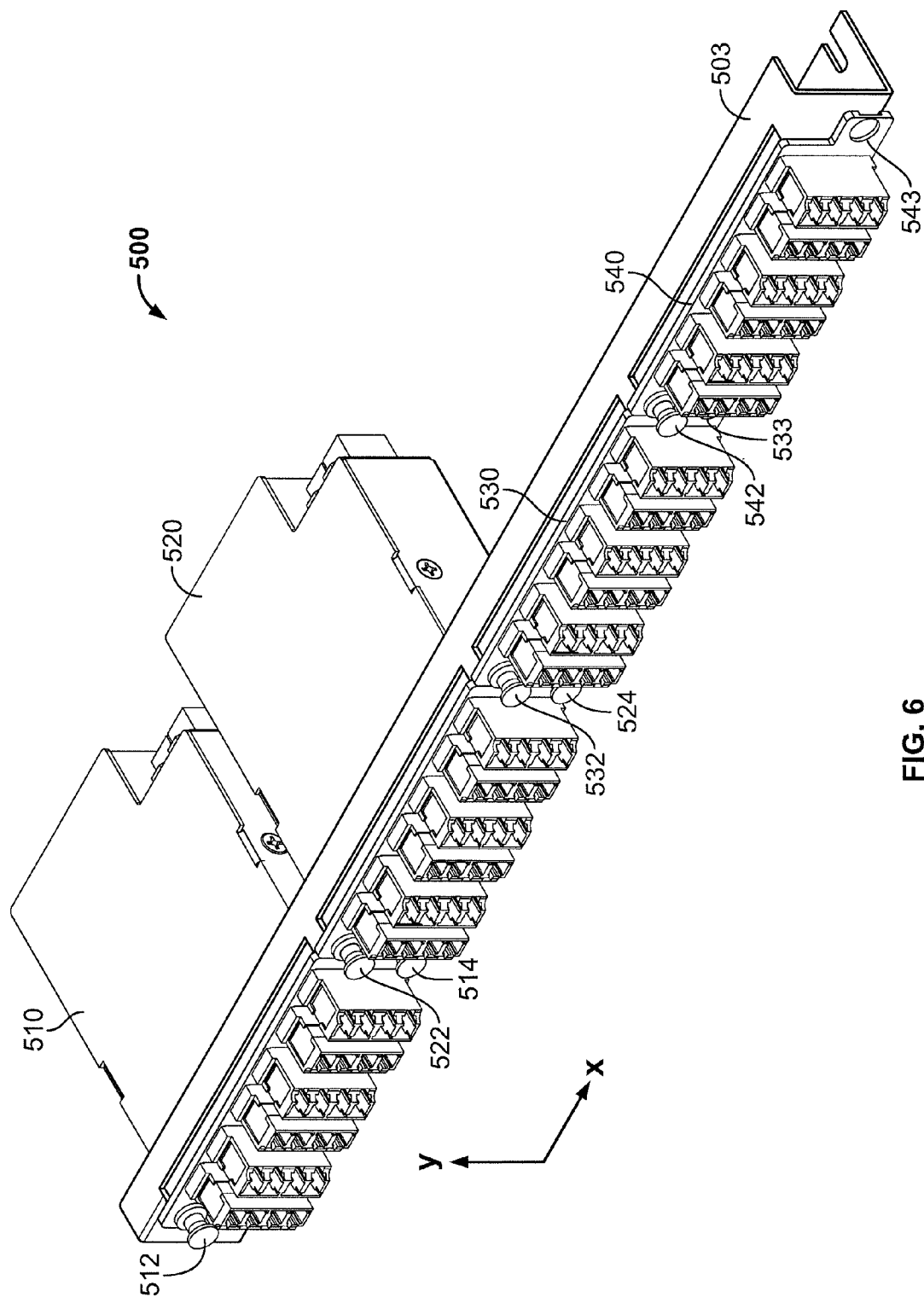
FIG. 6 is a perspective view of the plurality of interlocked mounting plates of FIG. 5.

With reference now to FIG. 6, a perspective view of the exemplary mounting arrangement 500 of FIG. 5 is depicted. FIG. 6 illustrates that plates 530 and 540 are configured to receive fiber optic connections but are not affixed to a connective device. In alternative embodiments plates 530 and 540 may be replaced with a mounting plate not configured to receive fiber optic connections as depicted in FIG. 2.

Figure 7:
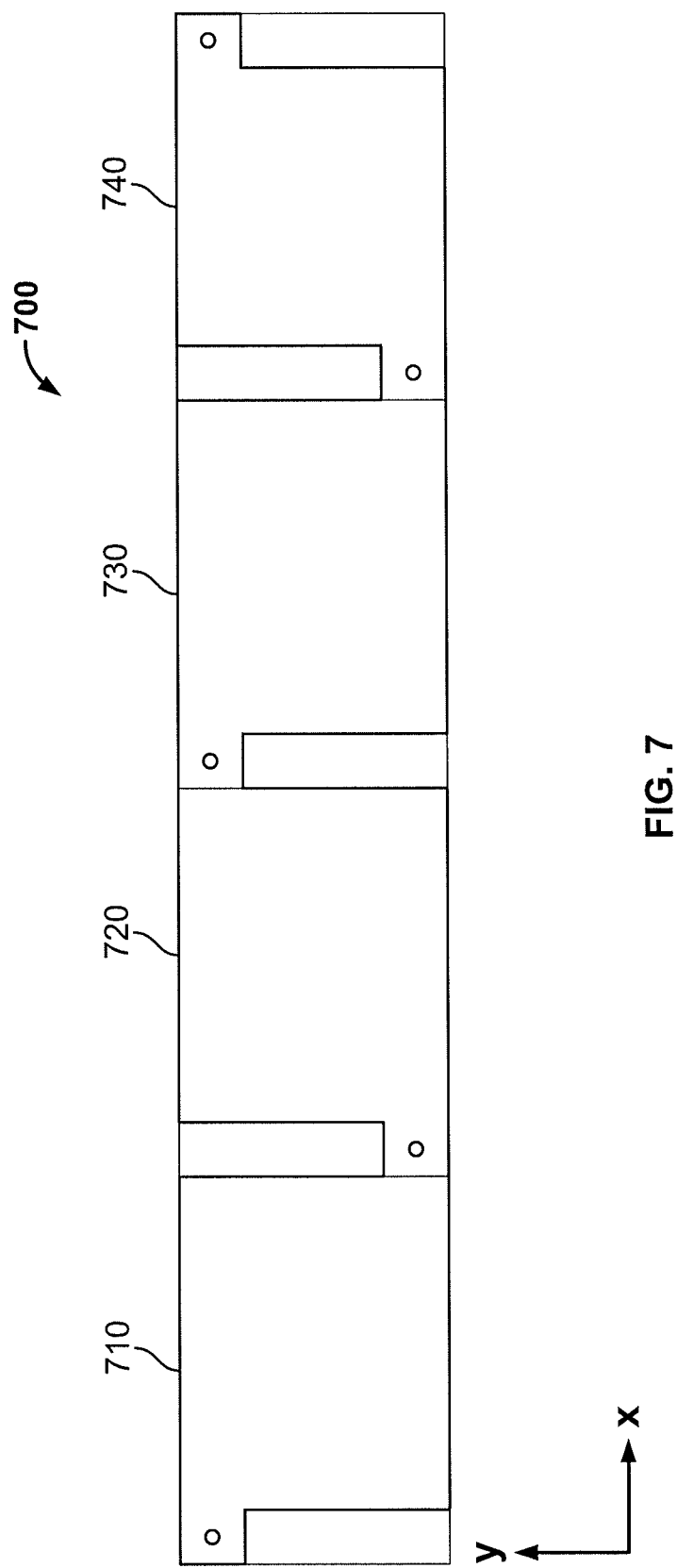
FIG. 7 is a front view of a plurality of overlapping mounting plates, namely four (4) partially overlapping mounting plates, positioned in side-by-side orientation according to the present disclosure.

Turning now to FIG. 7, a front view of another exemplary mounting arrangement 700 is illustrated. The mounting arrangement 700 includes four connective devices 710, 720, 730 and 740. Each connective device 710, 720, 730 and 740 includes the mounting plate of FIG. 2. Connective devices 710, 720, 730 and 740 are configured and arranged such that portions of the L-shaped mounting flanges from adjacent devices overlap. The devices 710, 720, 730 and 740 may be mounted into a mounting frame using fasteners that engage the holes of each overlapped mounting flange and a fastener receiving aperture in the mounting frame. In an alternative embodiment, the mounting arrangement 700 may be fastened directly to a rack by use of the appropriate number of connective devices and mounting plates to achieve the length of the rack in the x-direction.

As will be readily apparent to persons skilled in the art, exemplary mounting plates 100, 300 and 400 and mounting systems 500 and 700 described herein advantageously allow for overlapping or interlocking of mounting flanges. The mounting flanges are alternatively offset from the centerline of a plate for dense configuration of connective devices. In particular, when used as front plates for couplers or adapters, fiber-density per mounting frame unit increases due to the availability of additional horizontal space. Performance is unaffected by the reduction in mounting length or the increase of fiber density afforded by the reduction. Although exemplary embodiments of the mounting plate depicted herein use LC Quad-style adapters, other styles of adapters are suitable for use with mounting plates 100, 300 and 400 with a density unique to the style of adapter.

Although the present disclosure has been described with reference to exemplary embodiments and implementations, it is to be understood that the present disclosure is neither limited by nor restricted to such exemplary embodiments and/or implementations. Rather, the present disclosure is susceptible to various modifications, enhancements and variations without departing from the spirit or scope of the present disclosure. Indeed, the present disclosure expressly encompasses such modifications, enhancements and variations as will be readily apparent to persons skilled in the art from the disclosure herein contained.

What is claimed is:

1. A mounting system for connective devices, comprising:
    a first plate having a mounting body including at least two L-shaped mounting flanges at opposite ends thereof, wherein the mounting body defines a centerline bisecting the opposite ends and the mounting flanges are alternatively offset from the centerline of the mounting body;
    a second plate having a mounting body including at least two L-shaped mounting flanges at opposite ends thereof, wherein the mounting body defines a centerline bisecting the opposite ends and the mounting flanges are alternatively offset from the centerline of the mounting body; and
    a mounting frame;
    wherein the first plate and second plate are adapted for side-by-side mounting relative to the mounting frame with the L-shaped flanges in an interlocking or overlapping orientation.

2. The mounting system of claim 1, wherein at least one of the first plate and the second plate is constructed of a metal.

3. The mounting system of claim 1, wherein at least one of the first plate and the second plate is constructed of a plastic.

4. The mounting system of claim 1, wherein at least one of the first plate and the second plate is constructed of a combination of metal and plastic.

5. The mounting system of claim 1, wherein at least one of the first plate and the second plate is configured and dimensioned as the front plate of a connective device in a LAN.

6. The mounting system of claim 1, wherein the L-shaped mounting flanges are partially defined by a substantially curved extension portion.

7. The mounting system of claim 1, wherein the L-shaped mounting flanges are partially defined by a substantially triangular extension portion.

8. The mounting system of claim 1, wherein the mounting frame is one standard rack unit in height.

9. A method of mounting connective devices comprising:
    providing a first plate having a mounting body including at least two L-shaped mounting flanges at opposite ends thereof, wherein the mounting body defines a centerline bisecting the opposite ends and the mounting flanges are alternatively offset from the centerline of the mounting body, and wherein the mounting body is configured and dimensioned to support at least one coupler or adapter;
    providing a mounting frame configured and dimensioned to receive a plurality of plates;
    fastening the first plate to the mounting frame;
    providing a second plate having a mounting body including at least two L-shaped mounting flanges at opposite ends thereof, wherein the mounting body defines a centerline bisecting the opposite ends and the mounting flanges are alternatively offset from the centerline of the mounting body, and wherein the mounting body is configured and dimensioned to support at least one coupler or adapter; and
    fastening the second plate adjacent to the first plate within the mounting frame such that the mounting flanges of one side of the first plate interlock or overlap with the mounting flange of the adjacent side of the second plate.

10. The method of mounting connective devices of claim 9, wherein at least one of the plates is constructed of a metal.

11. The method of mounting connective devices of claim 9, wherein at least one of the plates is constructed of a plastic.

12. The method of mounting connective devices of claim 9, wherein at least one of the plates is constructed of a combination of metal and plastic.

13. The method of mounting connective devices of claim 9, wherein the L-shaped mounting flanges are partially defined by a substantially curved extension portion.

14. The method of mounting connective devices of claim 9, wherein the L-shaped mounting flanges are partially defined by a substantially triangular extension portion.

15. The method of mounting connective devices of claim 9, wherein the mounting frame is one standard rack unit in height.

* * * * *